US007020698B2

(12) United States Patent
Andrews et al.

(10) Patent No.: US 7,020,698 B2
(45) Date of Patent: Mar. 28, 2006

(54) SYSTEM AND METHOD FOR LOCATING A CLOSEST SERVER IN RESPONSE TO A CLIENT DOMAIN NAME REQUEST

(75) Inventors: Matthew Andrews, New Providence, NJ (US); Markus Hofmann, Fair Haven, NJ (US); Bruce Shepherd, Summit, NJ (US); Aravind Srinivasan, Highland Park, NJ (US); Peter Winkler, Madison, NJ (US); Francis Zane, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 846 days.

(21) Appl. No.: 09/726,192

(22) Filed: Nov. 29, 2000

(65) Prior Publication Data

US 2002/0038360 A1    Mar. 28, 2002

Related U.S. Application Data

(60) Provisional application No. 60/208,283, filed on May 31, 2000.

(51) Int. Cl.
  *G06F 15/173*    (2006.01)
(52) U.S. Cl. .................. 709/223; 709/203; 709/217; 709/224; 718/105
(58) Field of Classification Search ............... 709/217, 709/219, 223–226, 105, 203; 718/105
  See application file for complete search history.

(56) References Cited

U.S. PATENT DOCUMENTS

| 5,774,660 | A | * | 6/1998 | Brendel et al. | ............. | 709/201 |
| 5,924,116 | A | * | 7/1999 | Aggarwal et al. | .......... | 711/122 |
| 6,052,718 | A | * | 4/2000 | Gifford | ....................... | 709/219 |
| 6,070,191 | A | * | 5/2000 | Narendran et al. | .......... | 709/226 |
| 6,092,178 | A | * | 7/2000 | Jindal et al. | ................... | 712/27 |

(Continued)

*Primary Examiner*—Ario Etienne
*Assistant Examiner*—LaShonda Jacobs

(57) ABSTRACT

A scalable system and method for locating a closest server in response to a client request via an interactive distribution network, such as the Internet, are provided. A closest content server is defined as having the least round trip time for responding to a client request. The system including a plurality of content servers; and a local server in communication with a plurality of clients, the local server acting as a proxy for communicating client requests from clients to a redirection server. Client network distance and load information is periodically collected at each content server in the network from clients communicating with each of the respective content servers. The redirection server periodically aggregates the network distance and load information from each content server to create client clusters from both current and previously aggregated network distance and load information. Each client cluster represents a division or partition of the total IP address space. Each client cluster is then mapped (paired) to one or more content servers in the network. The mapping or pairing is then utilized to respond to client DN requests received from any client in the network. Another aspect of the invention involves considering the respective capacities of the content servers in the network. A selection probability is assigned to each content server/domain index pair to prevent the repeated selection of the content server having lowest round trip time thereby overloading that server's service capacity. The selection probabilities assigned to each content server effect a load balancing to prevent overloading. Another aspect of the invention involves collecting the distance and load information without incurring any overhead cost by passively collecting TCP information as it is transmitted from clients in communication with content servers in the course of normal communications.

15 Claims, 4 Drawing Sheets

U.S. PATENT DOCUMENTS

| | | | |
|---|---|---|---|
| 6,175,957 B1 * | 1/2001 | Ju et al. | 717/156 |
| 6,185,619 B1 * | 2/2001 | Joffe et al. | 709/229 |
| 6,237,061 B1 * | 5/2001 | Srinivasan et al. | 711/108 |
| 6,304,913 B1 * | 10/2001 | Rune | 709/241 |
| 6,314,465 B1 * | 11/2001 | Paul et al. | 709/226 |
| 6,324,580 B1 * | 11/2001 | Jindal et al. | 709/228 |
| 6,327,622 B1 * | 12/2001 | Jindal et al. | 709/228 |
| 6,351,775 B1 * | 2/2002 | Yu | 709/238 |
| 6,374,297 B1 * | 4/2002 | Wolf et al. | 709/226 |
| 6,389,448 B1 * | 5/2002 | Primak et al. | 718/105 |
| 6,446,121 B1 * | 9/2002 | Shah et al. | 709/224 |
| 6,484,143 B1 * | 11/2002 | Swildens et al. | 705/1 |
| 6,606,643 B1 * | 8/2003 | Emens et al. | 709/203 |
| 6,633,953 B1 * | 10/2003 | Stark | 711/108 |
| 6,665,702 B1 * | 12/2003 | Zisapel et al. | 718/105 |
| 6,671,259 B1 * | 12/2003 | He et al. | 370/238 |
| 6,724,733 B1 * | 4/2004 | Schuba et al. | 370/252 |
| 6,754,706 B1 * | 6/2004 | Swildens et al. | 709/225 |
| 6,795,860 B1 * | 9/2004 | Shah | 709/229 |
| 6,810,411 B1 * | 10/2004 | Coughlin et al. | 709/203 |
| 6,820,133 B1 * | 11/2004 | Grove et al. | 709/238 |
| 6,928,485 B1 * | 8/2005 | Krishnamurthy et al. | 709/242 |
| 6,947,992 B1 * | 9/2005 | Shachor | 709/228 |
| 2005/0010653 A1 * | 1/2005 | McCanne | 709/219 |

* cited by examiner

SYSTEM AND METHOD FOR LOCATING A CLOSEST SERVER IN RESPONSE TO A CLIENT DOMAIN NAME REQUEST

PRIORITY

The present application claims priority to a U.S. Provisional Application filed on May 31, 2000, by Andrews et al. having U.S. Provisional Application No. 60/208,283; the contents of which are incorporated herein by reference.

BACKGROUND OF THE INVENTION

1. Field of the Invention

The present invention relates generally to networks. More particularly, the present invention relates to a system and method for locating a closest server in response to a client domain name request by identifying a best-performing content server considering round trip time and service capacity.

2. Description of the Related Art

Methods and systems for resolving DNS requests are well-known. The basic domain name server (DNS) method is described in the paper by Mockapetris, P., entitled "Domain Names—Implementation and Specification", RFC 1035, USC Information Sciences Institute, November 1987.

At an early stage in the development of the Internet, the concept of distributing content throughout the network to better serve clients was not considered. Client DNS requests were always resolved to the same IP address (i.e., the same content server) for all clients irrespective of the client's location in the network. More recently, consideration has been given to the notion of improving the servicing of clients by resolving DNS requests differently depending upon the client's location in the network. A number of methods have been introduced which attempt to resolve DNS requests in this client-dependent manner.

One known method in the art that attempts to resolve client DNS requests differently depending upon the client's location in the network, utilizes pinging mechanisms on the content servers (i.e., caches). Whenever a user makes a request, the DNS sends out a message to all the content servers in the network to ping the requesting client. This method is problematic in that there is a significant latency associated with the DNS instructing the content servers to ping the requesting client. A further disadvantage of the ping approach is that many clients are either behind firewalls, and not pingable as a result, or else are configured to not accept pings.

Another known method for resolving DNS requests in a client-dependent manner is to download routing table information from the network. Routing tables, however, provide a coarse idea of client locations in a network. That is, the prefixes used in most routing tables cover a widely dispersed geographical area. This is problematic in that determining a client's position in a network cannot be performed with sufficient accuracy to provide an appropriate best-performing content server in response to a client DNS request.

Thus, there is a need to provide a method for locating content servers in a network in response to client DNS requests where the method has minimal round trip time.

SUMMARY OF THE INVENTION

The present invention is an improved system and method for responding to client requests. The improved system and method allows clients to obtain content from nearby content servers in a network which includes a plurality of content servers distributed throughout the network. A nearby content server is defined as having the least round trip time for responding to a client request.

A system according to an embodiment of the present invention for resolving requests in a client-dependent manner includes a plurality of content servers; and a local server in communication with a plurality of clients which serves as a proxy for communicating client requests from clients to a redirection server. The redirection server is coupled to the local server and the plurality of content servers.

A method consistent with the present invention for determining a best-performing content server in response to a client request, such as, for example a client request for domain "www.cnn.com", generally comprises the steps of: collecting client network distance and load information at each content server in the network from those clients communicating with the respective content servers; periodically aggregating the network distance and load information from each content server at the redirection server; periodically creating client clusters at the redirection server from current and previously aggregated network distance and load information where each client cluster represents a division or partition of the total IP address space; mapping each created client cluster to one or more content servers/domain index pairs; assigning a selection probability to each content server/domain index pair; and utilizing the mapping to respond to client DN requests received from any client in the network.

According to one aspect of the invention, consideration is given to the respective capacities of the content servers in the network. In the least sophisticated implementation of the method of the present invention, a content server is always selected which has the lowest round trip time. Problems may arise, however, in that repeatedly selecting the content server having lowest round trip time may overload that server's service capacity. To circumvent this occurrence selection probabilities are assigned to each content server to effect a load balancing. That is, the selection probabilities will statistically select a server different from the server having the lowest round trip time to ensure that a content server's maximum service capacity is never exceeded.

According to another aspect of the invention, the clustering/mapping operation is performed periodically at the redirection server. However, additional means are provided for performing the clustering/mapping operation whenever an unanticipated change in network topology is detected (e.g., failed switches, failed content server).

A distinguishing feature of the system of the present invention over known systems is that the clustering/mapping is created using information provided from only a subset of clients in the network. That is, distance and load information is collected from only those clients in communication with the respective content servers in the network. The mapping created from the information, however, is used to resolve DNS requests from all clients in the network. This is advantageous as it is inefficient to create a separate mapping or assignment for every IP address in the network (e.g., Internet). By creating a mapping from only a small subset of clients an efficiency is realized in that it becomes unnecessary to laboriously map each individual client in the network with a best-performing content server.

Another distinguishing feature of the system of the present invention over known systems is that the present invention advantageously collects the distance and load information without incurring any overhead cost by passively collecting TCP information as it is transmitted from clients in communication with content servers in the course of normal communications. No active messaging above and beyond the existent TCP protocol messaging is required to collect the required distance and load information.

A further distinguishing feature of the system of the present invention over known systems is that the system of the present invention automatically adapts to changes in the network as the round trip time of communicating clients change. This occurs as a consequence of collecting the TCP information as described above. Changing network conditions are instantaneously reflected in the TCP information transmitted between clients and content servers.

A still further distinguishing feature of the system of the present invention over known systems is that the system of the present invention does not make an a-priori estimation or prediction of the network locations of the respective content servers in the network prior to performing the method of the present invention for locating a best-performing content server. Rather, each content server's location is determined in real-time from the communicated distance and load information as described above.

Another distinguishing feature of the system of the present invention over known systems is that the mapping result, which associates client clusters with content servers is client-dependent. According to the invention, the mapping depends upon the computation of network distances. As such, the computed network distance may be different for each client in the network.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

that satisfy the client request with minimum round trip time, while respecting each content server's service capacity, referred to herein as best-performing content servers. To prevent the situation where a content server's service capacity may be exceeded, the invention assigns selection probabilities to each content server based on the data flow of the network.

The system and method achieves the general objective of locating best-performing content servers by periodically performing a clustering/mapping operation in real time at a redirection server. The clustering/mapping operation first performs a clustering operation which creates client clusters (i.e. groups of clients having similar network distance properties), the client clusters are then input to a mapping operation which maps or associates the client clusters with best-performing content servers in the network. The clustering operation generally includes the steps of periodically collecting at the redirection server, load and distance information from each content server in the network and using the collected distance and load information to partition clients into groups or clusters according to Classless Inter-Domain Routing (CIDR) address prefix similarity. Upon completing the clustering operation, the created client clusters are then provided as input to a mapping operation which maps or associates the client clusters to best-performing content servers in the network. A content server is considered to be best-performing with respect to a client cluster by having low round trip time in response to content requests from clients located within the client cluster. The mapping operation further assigns a selection probability to each identified best-performing content server such that the assigned probability ensures that the content server will be selected in a manner which will not exceed the content server's maximum service (i.e., load) capacity.

The map which is generated by the mapping operation consists of a plurality of rows of the general form:

| CLIENT CLUSTERS INPUT FROM THE CLUSTERING OPERATION | CLIENT CLUSTER ADDRESS PREFIX | DOMAIN IDENTIFIER | BEST PERFORMING CONTENT SERVERS | CONTENT SERVER SELECTION PROBABILITY |
|---|---|---|---|---|
| Y | 135.104.23.XX | X | Z | .3 |
| Y | 135.104.23.XX | X | Z2 | .7 |
| Y2 | 135.104.21.XX | X2 | Z3 | .95 |

Figure 2:
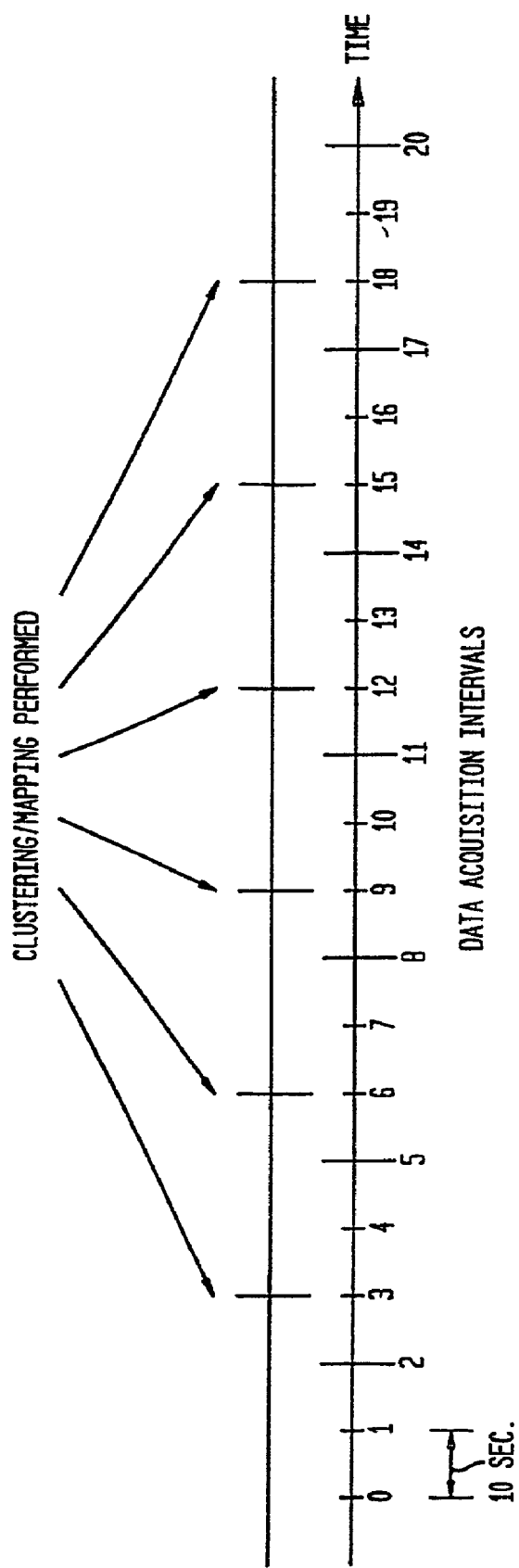
Figure 3:
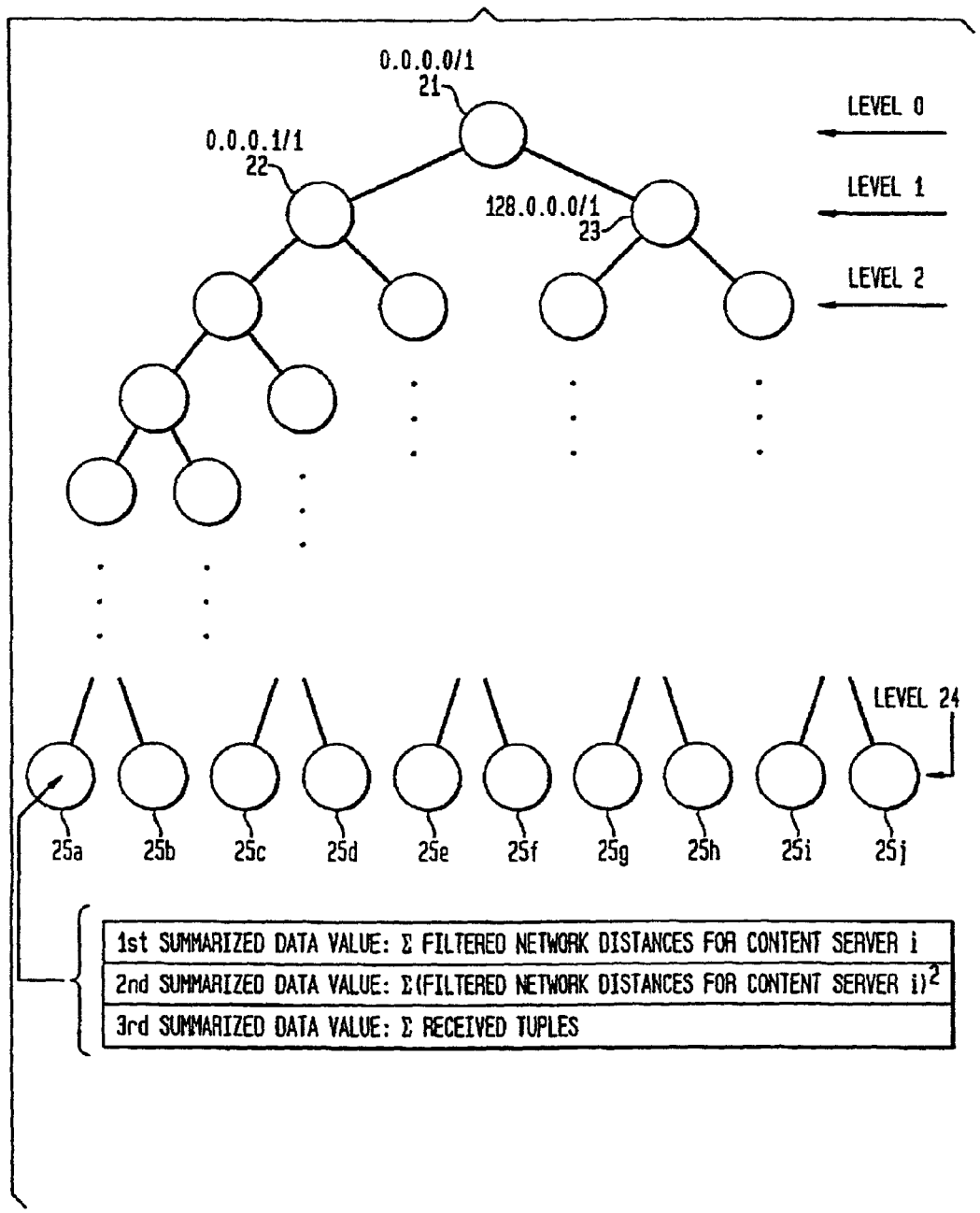
Figure 4:
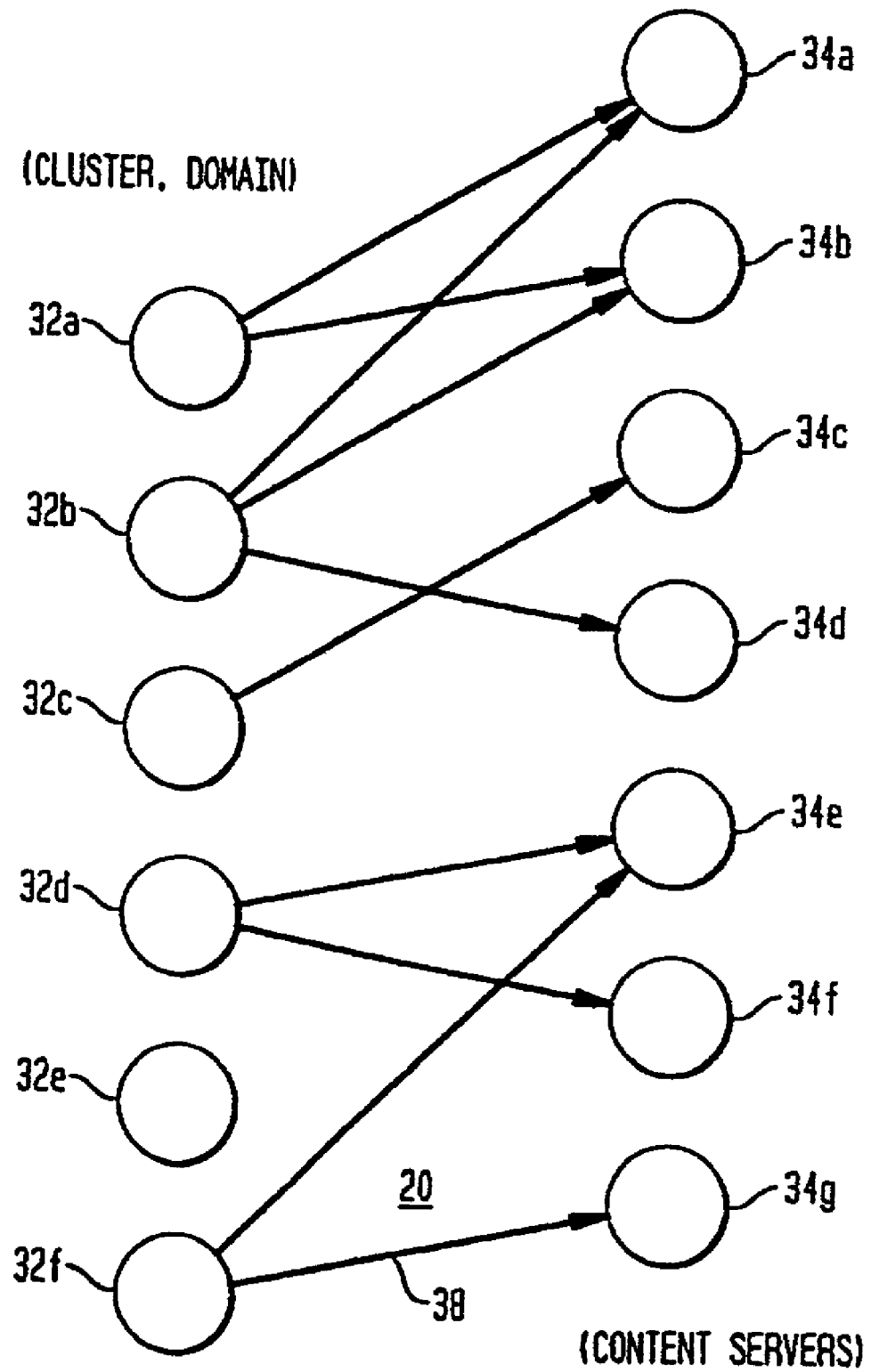

FIG. 2 is a time-line for describing the timing of the data flow from the content servers to the redirection server;

FIG. 3 is an illustration of a portion of a binary tree for clustering a plurality of clients according to the present invention; and FIG. 4 is a flow map which characterizes the data flow in the system and for determining the probabilities included in the mapping table.

DETAILED DESCRIPTION OF THE PREFERRED EMBODIMENTS

General Overview

The present invention provides a scalable system for resolving DNS queries in a client-dependent manner. In accordance with the invention, software means is provided at a redirection server for responding to client DNS requests by identifying one or more content servers in the network Column 1 of the table illustrates a few representative client clusters (i.e., Y, Y2) created by the clustering operation which is resident at the redirection server. As shown, the mapping associates the created client clusters with best-performing content servers in the network.

As one example of how the table is used, when a client request for a particular domain "yahoo.com", for example, is received at the redirection server, the client's IP address prefix is used as an index to the map to determine the appropriate map row having a CIDR address prefix similar to the client's IP address. Upon determining the appropriate map row, a best-performing content server selection must be made from the listed best-performing content servers in that row. That is, each map row may typically include two or more best-performing content servers from which one must be selected. To make such a selection, each best-performing content server will have associated therewith a selection probability indicative of the preference for that content server. For example, a content server with an associated selection probability of 0.90 is a more likely selection candidate as a best-performing content server than a content server whose associated selection probability is 0.05. As a further illustration of the process of selecting a best-performing content server from an identified map row, assume, for example, a map row includes three best-performing content servers whose associated selection probabilities are 0.90, 0.04, and 0.06, respectively. A random number between zero and one is chosen in accordance with the selection method. If the random variable is between 0–0.90, the best-performing content server is selected whose associated selection probability is 0.90. Otherwise if the random variable is between 0.90–0.94, the best-performing content server is selected whose associated selection probability is 0.04. Finally, if the random variable is between 0.94–1, the best-performing content server is selected whose associated selection probability is 0.06.

It is noted that while the invention is primarily directed to identifying best-performing content servers in accordance with DNS type requests, the invention also contemplates existing and future messaging protocols different from the DNS protocol for communicating requests and responses between clients and content servers.

Figure 1:
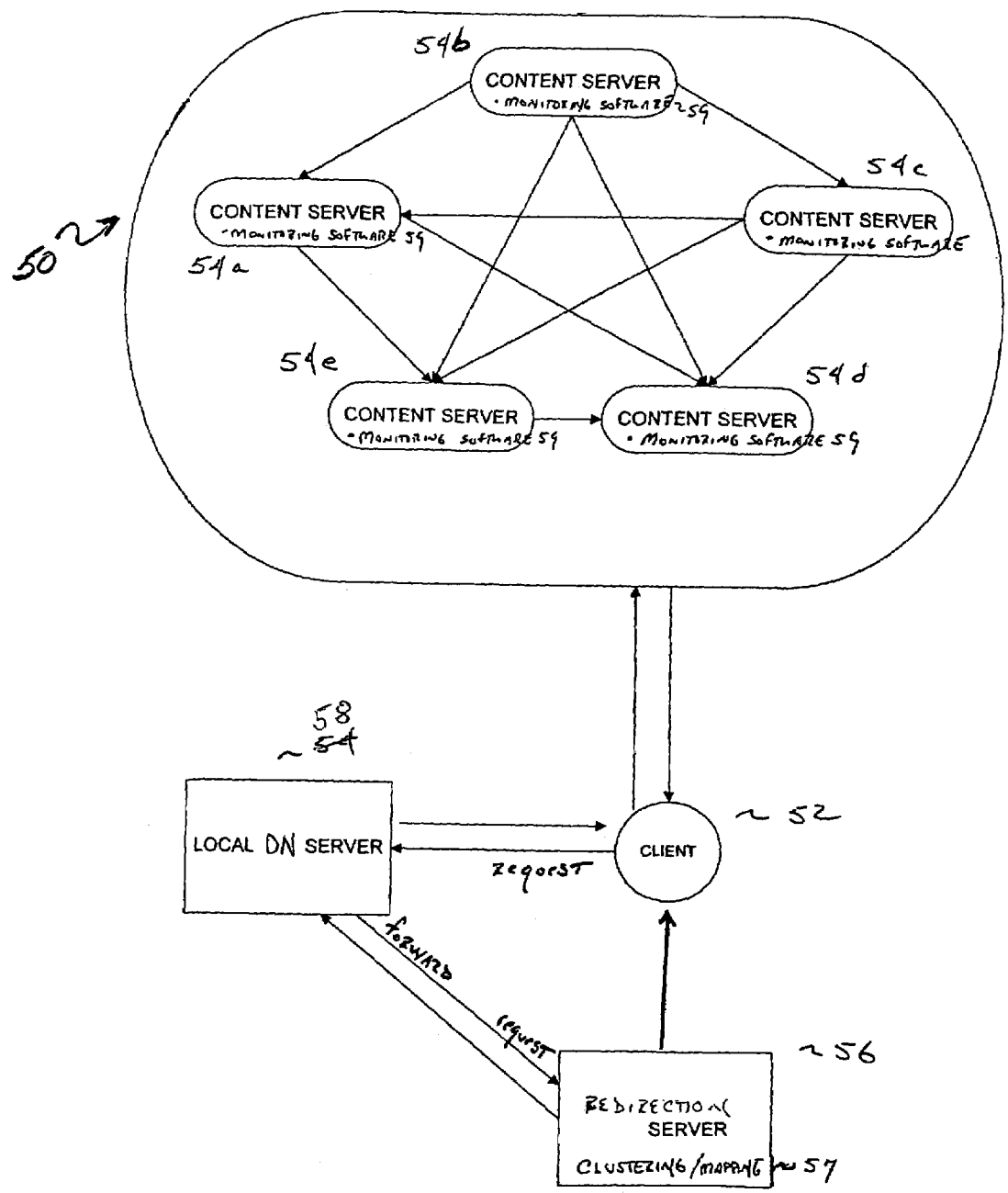
FIG. 1 is a diagram illustrating a network system according to the present invention.

Referring now to the drawings, in which like reference numerals identify similar or identical elements. FIG. 1 is a block diagram of a public network system 50 according to an embodiment of the present invention. The public network system 50 is a high-speed, high bandwidth interactive distribution network. For illustrative purposes, public network system 50 is the Internet, an intranet, an extranet or any other known network. Local DN server 58 is one of a plurality of servers which are accessible by clients, one of which is illustrated by client 52. The public network system 50 further includes a plurality of redirection servers, one of which is illustrated by redirection server 56.

It is assumed that clients make domain name (DNS) requests to local DN servers. FIG. 1 shows a local DN server 58 receiving a DNS request from a client 52. The local DN server 58 is shown forwarding the client request to a redirection server 56. The redirection server 56 responds to the client request by returning to the client 52 the IP address of a content server 54a–e in the network determined to be a preferred content server.

It is noted that the present invention makes no a-priori assumptions about the location of the respective content servers 54a–e in the network. The locations are discovered by collecting network distance information in accordance with the method of the present invention.

System Operation

The system of the present invention for identifying a preferred content server in response to a client DN request includes software resident exclusively in the memory of the redirection server 56, referred to herein as clustering/mapping software 57, and software resident in the memory of each content server 54a–e in the network, referred to herein as monitoring software 59.

Generally, the monitoring software provided at each content server 54a–e in the network periodically collects network distance information and load information from communicating clients. The clustering/mapping software 57 pulls the distance and load information collected at each content server 54a–e to perform a clustering/mapping operation. The clustering operation involves using past and present collected distance and load information to partition the IP address space into groupings, referred to herein as client clusters. An estimate of the network distance of each client cluster to each content server in the network is also calculated. The mapping operation maps each client cluster to one or more preferred content servers in the network. The map is used by the redirection server 56 to service client DNS requests.

FIG. 2 is a time-line for describing the timing associated with performing the data flow processes described above. That is, the process of collecting network distance and load information, and the process of performing the clustering/mapping operation. FIG. 2 illustrates a time-line including discrete time intervals where each discrete time interval represents 10 seconds in one embodiment. Other embodiments may define the data acquisition interval to be other than 10 seconds.

At each discrete time interval, distance and load data is collected by the redirection server. The data collected from each content server 54a–e represents distance and load data from clients communicating with the respective content servers 54a–e. The data collected by the redirection server 56 at each discrete time interval is combined with exponentially smoothed data collected in all previous time intervals. That is, prior to combining present data with previously collected data, the previously collected data is exponentially smoothed. In one embodiment, exponential smoothing of the previously collected data is performed by multiplying the data by an aging or weighting multiplier at each discrete time interval. In a preferred embodiment, the weighting multiplier is set to 0.95 applied each hour.

In addition to aggregating data by the redirection server at each discrete time interval a clustering/mapping operation is performed at every third time interval in one embodiment as will be described below in Section II.

The details concerning the described operations of collecting distance and load information at each content server and aggregating that data at the redirection server in each discrete time interval is discussed with reference to Section I entitled "monitoring software".

Monitoring Software

Distance and load information is continuously collected at each content server 54a–e from communicating clients. The distance and load information is collected by monitoring software 59 resident in the memory of each content server 54a–e in the network. The distance information is collected at each content server 54a–e as distance tuples of the general form $$\{\text{Timestamp, content server ID, client IP address, network distance}\} \quad \text{Eq. 1}$$

where Timestamp is the time at which the network distance measurement was made, content server (i.e., cache) ID identifies the particular content server 54 making the measurement, and client IP address identifies the particular client 52 accessing the content server.

Network distance may be measured in a number of ways. A preferred method for measuring network distance is by computing the round trip time (RTT), defined as the time taken for a packet to travel from content server to client and back again. Two methods for calculating the RTT are described below. It is noted that other approaches for calculating the RTT are within the scope of the present invention, such as, for example, measuring the bandwidth, jitter or packet loss.

One method for calculating the RTT as a measure of network distance involves utilizing the tcpdump utility which is a standard utility well known in the art. The tcpdump utility monitors all packets being transmitted and received by a host (e.g., content server). One drawback of using the tcpdump utility as a measure network distance is that it can only be computed for those clients accessing the content server. A corresponding benefit of using the tcpdump utility is that it does not involve any additional overhead. That is, the data is already available because it is a pre-existing process that occurs irrespective of the present invention. A further advantage of the tcpdump utility is that it is highly adaptive in the sense that it instantly reflects the ever-changing state of the Internet.

The process by which RTT is measured via the tcpdump utility is as follows. The process measures the TCP three-way handshake for each TCP connection. This handshake consists of a client sending a SYN packet to the host, the content server responds with a SYN packet, and the client responds with an ACK. The RTT is computed as the difference between the transmission time of the host's SYN packet and the receipt time of the client's ACK packet. Since both these events occur at the content server, they can be monitored by tcpdump thereby providing one measure of RTT. In addition to measuring RTT, the tcpdump utility can also measure the load on each content server which must be periodically reported to the redirection DN server in addition to the distance information.

A second method for measuring RTT in accordance with the present invention involves the use of pings. As is well known in the art, a ping is a packet that can be sent from the content server to a specific client in order to determine the network distance to that client. If the client is configured to accept pings it will send back a ping response. In this case, the network distance (i.e., RTT) is determined as the time difference between sending the initial ping and receiving the ping response.

It is noted that using the ping approach over the tcpdump utility is advantageous in that clients may be actively selected throughout the network to receive the ping, whereas tcpdump only provides information for those clients that are already communicating with the content server. A disadvantage of the ping approach, however, is that it generates additional traffic on the network. A further disadvantage of the ping approach is that many clients are either behind firewalls, and not pingable as a result, or else are configured to not accept pings.

The present invention is not limited to determining the RTT by employing the approaches discussed above. As an alternative, the present invention contemplates using combinations of the tcpdump and ping approaches as well as alternate methods for determining the network distance.

In addition to collecting distance information at each content server $54a$–$e$, load information is collected at each content server $54a$–$e$ as tuples of the form $$\{\text{Timestamp, cache ID, client IP address, number of hits, domain index}\} \quad \text{Eq. 2}$$

where Timestamp, cache ID, and client IP address are as defined above, the number of hits is a measure of the number of client accesses in a particular data acquisition interval.

Domain Indices

The system of the present invention may conceivably include a large number of domains. Given the large number of domains, the process of identifying the content server 54 having minimum round trip time in response to a client domain name request can be significantly slowed. The present invention addresses this concern by grouping domains which have their content stored on the same subset of content servers $54a$–$e$ in the network, referred to herein as domain indices. It is noted that the domains which make up a particular domain index may be wholly unrelated in terms of their subject matter. The sole criterion for determining a domain index is co-location of content on the same subset of content servers $54a$–$e$.

The clustering/mapping software 57, which is described more completely in Section II, maintains a domain list, which is a listing of all domain indices in the system along with those content servers $54a$–$e$ in the network that store the domain indices. Table I is an exemplary illustration of a representative domain list.

TABLE I

| domain index | constituent domains in the index | content servers |
|---|---|---|
| 0 | bell-labs.com, yahoo.com, ebay.com | 0, 2, 4 |
| 1 | yahoo.com, espn.com, nasa.com | 2, 3, 4 |
| 2 | lucent.com, amazon.com | 2, 4 |

Column 1 of Table I is a domain index identifier. Each domain index is assigned a positive integer value for identifying the domain index. In a practical application the number of domain indices could number in the hundreds. The second column of Table I describes the domain names which make up the domain index. For example, domain index 0 includes three domains, bell-labs.com, yahoo.com and ebay.com. The third column describes the subset of content servers in the network which store the domain index. For example, domain index zero is only stored at content servers 0, 2 and 4 in the network.

Clustering/Mapping Software

As stated above, the redirection DN server 56 performs a clustering/mapping operation preferably at every third discrete time interval to create a mapping to respond to client DN requests. The clustering/mapping software 57 includes a clustering operation in which client clusters having similar CIDR address prefixes are created and a mapping operation which maps or associates the created client clusters with one or more best-performing content servers in the network The clustering and mapping operations are described in detail below.

A. Clustering Operation

Before the clustering operation can be described it is first necessary to describe a preferred IP addressing scheme. The invention utilizes the classless inter-domain routing (CIDR) style of addressing, which is well known in the art. An example of a CIDR style address is 135.104.0.0/16, which indicates the set of all IP addresses which match the IP address "135.104.0.0" in the first 16 bits (i.e., 135.104). As will be described below, the clustering operation groups clients into client clusters using CIDR style addressing. Thus, the set of client clusters output from the clustering operation will be a list whose elements are of the general form "a.b.c.d/n". Choosing CIDR style addressing is advantageous in that it allows quick look-ups. In addition, CIDR addressing reflects the structure inherent in the way IP addresses are assigned and managed.

It is noted that the use of alternative addressing schemes is contemplated by the invention, such as, for example, viewing the IP addresses as integers and forming client clusters consisting of all IP addresses whose integer representation falls between two endpoints.

The objective of the clustering operation is to partition the total IP address space into smaller clusters or groups where each cluster is defined by a particular CIDR address prefix. Each cluster is made up of clients having IP address prefixes which match the CIDR address prefix of the cluster. In addition to creating client clusters, the clustering operation also provides an estimate of the mean network distance from clients in each client cluster to each content server 54a–e in the network.

The clustering operation, which outputs a set of client clusters, is preferably performed at a prescribed fixed interval (e.g., every 30 seconds which is equivalent to every third data acquisition interval). However, it is noted that the clustering and mapping operations may be programmed to be performed at any interval as determined by the system requirements. It is also contemplated that in addition to performing the clustering operation at prescribed intervals, override means are provided to output a set of client clusters whenever a change in network topology or a content server failure is identified. Referring again to FIG. 2, at each data acquisition interval (e.g., 0, 1, 2, . . . ) the clustering/mapping software resident at the redirection server 56 pulls the distance and load tuples from each content server 54a–e in the network (See Eqs. 1 and 2). The distance and load tuples are provided as input to the clustering operation.

The clustering operation first pre-filters the distance and load tuples prior to calculating three summarized data values. Pre-filtering of the tuple data is performed according to one embodiment by taking the logarithm of the received network distance values. It has been experimentally shown that by first taking the logarithm of the network distance values, better client clusters are output from the clustering operation.

The clustering operation then sorts the distance and load tuples into groupings or client clusters according to the client's IP address. For each client cluster which defines a particular IP address prefix, three summarized data values are computed:

$1^{st}$ Summarized data value=Sum of filtered network distances for content server i      Eq. 3

$2^{nd}$ Summarized data value=Sum of squares of filtered network distances for content server i      Eq. 4

$3^{rd}$ Summarized data value=the total number of received tuples in the present discrete time interval and all previous discrete time intervals      Eq. 5

The three summarized data values (Eqs. 3–5) represent the only stored values in the clustering operation. The manner in which the summarized data values are stored will be described below with reference to a binary data tree structure. In addition to storing the three summarized values, the three values are further used to compute a mean and variance for performing a similarity test between clusters. As will be described below, each cluster represents a node in the binary tree. The similarity test therefore compares sibling nodes in the tree and combines nodes when it is determined that there is sufficient similarity. A mean and variance are computed in each cluster for each content server as:

Sample mean of network distance of content server i=(Sum of filtered network distances for content server i)/total number of received tuples)      Eq. 6

Eq. 7

Sample variance of network distance of content server i. The sample variance for n numbers $$x_1, \ldots, x_n \text{ is } \frac{1}{n-1}\left(\sum_j x_j^2 - \frac{\left(\sum_j x_j\right)^2}{n}\right).$$

This can be computed since we are storing the number of received tuples n, the sum of filtered network distances $$\left(\sum_j x_j\right)$$

and the sum of the squares of the filtered network distances $$\left(\sum_j x_j^2\right).$$

The clustering operation stores the three summarized data values (i.e., Eqs. 3–5) in a binary tree data structure as input to the clustering operation. Binary tree data structures are well known in the art. It is further noted that non-binary tree data structures may be used in alternate embodiments, for example, hex, octal, or base 10 trees.

The clustering operation embodied as a binary tree data structure will now be described in the context of a specific example with reference to FIG. 3.

FIG. 3 is an exemplary illustration of a binary tree for describing the clustering operation. As shown in FIG. 3, the root node 21 is labeled "0.0.0.0/0" in accordance with the CIDR addressing scheme, and denotes the set of all IP addresses. The root node has two children 22, 23 labeled "0.0.0.0/1" and "128.0.0.0/1". Although IP addresses are received from each content server with 32-bit precision, as a practical matter since addresses which differ only in the last 8 bits typically belong to the same tightly-coupled network, the 32-bit addresses are reduced to 24 bit precision defining the granularity of all addresses supplied to the clustering operation. 24-bit granularity is derived from the received 32-bit granularity by simply truncating the last 8 bits of received IP addresses. Each leaf node 25a–j of the tree represents a particular 24-bit IP address prefix.

To perform the clustering operation using a binary tree structure such as the one illustrated in FIG. 3, the clustering/mapping software first sorts the distance and load tuple information collected in the present discrete time interval into groupings according to the supplied client's IP address. For each grouping the three summarized data values (See Eqs. 3–5) are computed. That is, the sum of pre-filtered network distances, the sum of the squares of prefiltered network distances, and the total number of received tubles is computed and stored at each of the respective leaf nodes 25a–j of the binary tree, where each leaf node 25a–j represents a particular IP address grouping. Three stored values for representative node 25a are shown in FIG. 3. Similar summarized values are stored at each of the respective leaf nodes (i.e., nodes 25b–j)

Table II further illustrates exemplary distance tuples which may be received at the redirection server 56 at a particular discrete time interval. The distance tuples are of the general form defined by Eq. 1.

TABLE II

| Distance Tuple | Time-stamp | Content Server ID | Client IP address | network distance |
|---|---|---|---|---|
| 1 | 957197632 | 1 | 135.104.23.16 | 56 |
| 2 | 957197635 | 1 | 135.104.23.102 | 55 |
| 3 | 957197632 | 1 | 101.13.12.47 | 73 |
| 4 | 957197623 | 2 | 170.151.22.64 | 24 |
| 5 | 957197646 | 2 | 170.151.22.33 | 22 |
| 6 | 957197633 | 3 | 170.151.22.189 | 348 |
| 7 | 957197634 | 3 | 170.151.22.64 | 349 |
| 8 | 957197629 | 3 | 204.178.224.1 | 18 |
| 9 | 957197638 | 3 | 170.151.22.241 | 348 |
| 10 | 957197640 | 4 | 135.104.23.16 | 22 |
| 11 | 957197632 | 4 | 170.151.22.64 | 276 |
| 12 | 957197633 | 4 | 101.13.12.34 | 173 |
| 13 | 957197630 | 4 | 170.151.22.203 | 277 |
| 14 | 957197641 | 5 | 135.104.23.56 | 103 |
| 15 | 957197636 | 5 | 204.178.224.1 | 278 |

The redirection server sorts the 15 received distance data tuples into groupings defined herein as client clusters characterized by the similarity of their IP address prefixes. For example, Table III.a illustrates that distance tuples 1, 2, 10 and 14 have respective IP addresses 135.104.23.16, 135.104.23.102, 135.104.23.16 and 135.104.23.56. Each IP address prefix, 135.104.23 is determined to be identical and the distance tuples are therefore grouped as one client cluster identified by the cluster prefix 135.104.23.

rized data values (Eqs. 3–5) will be computed and stored at a corresponding leaf node of the binary data tree. It is further noted that the three summarized data values are computed for each content server in the client cluster. For example, referring to the client cluster represented by Table III.d, three summarized data values will be independently computed for content servers 2, 3 and 4 totaling nine separately computed values.

Once the binary tree is initially populated with the summarized data at the leaf nodes (i.e., the 24-bit level), the clustering operation utilizes an algorithm whose operation is analagous to performing a pruning operation on the initial binary tree to produce a reduced binary tree. Pruning the binary tree, according to the invention, involves evaluating sibling leaf nodes to determine whether there is sufficient similarity between the nodes. When sufficient similarity is found between two sibling leaf nodes of the tree, those nodes are pruned from the tree and the summarized data associated with each leaf node is aggregated or folded into the parent node. At the end of the clustering operation, when it is determined that leaf nodes can no longer be folded or aggregated into parent nodes, the clustering operation is complete. At this point, the resultant leaf nodes represent the resultant client clusters which are provided as input to the mapping operation. The clustering operation also provides an estimate of the network distance from each client cluster to each of the content servers in the network.

TABLE III.a

| Distance Tuple | Time-stamp | Content Server ID | Client IP address | network distance | Binary tree node |
|---|---|---|---|---|---|
| 1 | 957197632 | 1 | 135.104.23.16 | 56 | 135.104.23.0/24 |
| 2 | 957197635 | 1 | 135.104.23.102 | 55 | 135.104.23.0/24 |
| 10 | 957197640 | 4 | 135.104.23.16 | 22 | 135.104.23.0/24 |
| 14 | 957197641 | 5 | 135.104.23.56 | 103 | 135.104.23.0/24 |
| 13 | 957197630 | 4 | 152.134.72.16 | 72 | 152.134.72.0/24 |

TABLE III.b

| Distance Tuple | Time-stamp | Content Server ID | Client IP address | network distance | binary tree node |
|---|---|---|---|---|---|
| 8 | 957197629 | 3 | 204.178.224.1 | 18 | 204.178.224.0/24 |
| 15 | 957197636 | 5 | 204.178.224.1 | 278 | 204.178.224.0/24 |

TABLE III.c

| Distance Tuple | Time-stamp | Content Server ID | Client IP address | network distance | binary tree node |
|---|---|---|---|---|---|
| 3 | 957197632 | 1 | 101.13.12.47 | 73 | 101.13.12.0/24 |
| 12 | 957197633 | 4 | 101.13.12.34 | 173 | 101.13.12.0/24 |

TABLE III.d

| Distance Tuple | Time-stamp | Content Server ID | Client IP address | network distance | binary tree node |
|---|---|---|---|---|---|
| 4 | 957197623 | 2 | 170.151.22.64 | 24 | 170.151.22.0/24 |
| 5 | 957197646 | 2 | 170.151.22.33 | 22 | 170.151.22.0/24 |
| 6 | 957197633 | 3 | 170.151.22.189 | 348 | 170.151.22.0/24 |
| 7 | 957197634 | 3 | 170.151.22.64 | 349 | 170.151.22.0/24 |
| 9 | 957197638 | 3 | 170.151.22.241 | 348 | 170.151.22.0/24 |
| 11 | 957197632 | 4 | 170.151.22.64 | 276 | 170.151.22.0/24 |
| 13 | 957197630 | 4 | 170.151.22.203 | 277 | 170.151.22.0/24 |

Each of Tables IIIa–d has similar 24 bit IP addresses. Each table represents a client cluster for which the three summa- The test for sufficient similarity for two client clusters (i.e., sibling leaf nodes in the binary tree) involves a two-sample t-test, which is a well known in the art. The statistical t-test determines whether two sets of samples (e.g., two client clusters) have the same mean. This determination is made by checking whether the difference between the means of the two sets of samples is large compared to the variance in the data.

An example is provided to more fully illustrate the similarity test. Consider two nodes X and Y, where each node represents a client cluster. Let $x_1, \ldots, x_m$ represent m network distances of clients in node X to a selected content server Z in the network, and let $y_1, \ldots, y_n$ represent n network distances of clients in Y to the selected content server Z in the network. The objective of the similarity test is to statistically determine whether the network distance of the two client clusters, X and Y, are sufficiently similar by computing the value T and determining whether T is above or below a predetermined similarity threshold. The value of T is computed using the summarized data values (Eqs. 3–5) computed for each client cluster. The T value is preferably computed as:

$$T = \frac{\overline{X} - \overline{Y}}{S_p \sqrt{1/m + 1/n}} \text{ where,}$$

$$\overline{X} = \frac{\sum_j x_j}{m}$$

$$\overline{Y} = \frac{\sum_j y_j}{n}$$

$$S_p = \frac{(m-1)S_X + (n-1)S_Y}{m+n-2}$$

$$S_X = \frac{1}{m-1}\left(\sum_j x_j^2 - \frac{\left(\sum_j x_j\right)^2}{m}\right)$$

$$S_Y = \frac{1}{n-1}\left(\sum_j y_j^2 - \frac{\left(\sum_j y_j\right)^2}{n}\right)$$

Two client clusters are declared to be sufficiently similar if the value of T is computed to be below some predetermined threshold.

In addition to evaluating leaf nodes in accordance with the equation above, it is noted that the clustering algorithm further provides capabilities for manually determining apriori that two sibling should either always be combined (i.e. folded into a parent node) or never be combined.

At the completion of the clustering operation when leaf nodes can no longer be aggregated or folded into parent nodes as determined by the sufficient similarity test, the resulting leaf nodes represent resultant client clusters to be provided as input to the mapping operation. Table IV illustrates an exemplary output of the clustering operation.

TABLE IV

| client cluster | content server | MeanNetwork distance from client cluster to content server | testing index to content server |
|---|---|---|---|
| X CIDR prefix = 135.104.23.xx | 1 | 10 | 9 |
| X | 2 | 15 | 15 |
| X | 3 | 20 | 14 |
| X | I | 23 | 23 |
| X | I + 1 | 44 | 44 |
| ⋮ | | | |
| X | N | | |
| ⋮ | | | |
| Y CIDR prefix = 135.104.21.xx | 1 | 8 | 8 |
| Y | 2 | 14 | 12 |
| Y | 3 | 21 | 21 |
| Y | I | 11 | 11 |
| Y | I + 1 | 46 | 46 |
| ⋮ | | | |
| Y | N | | |

Two exemplary client clusters X and Y (i.e., leaf nodes of the reduced binary tree) are shown in Table IV, i.e., as a partial output from the clustering operation. Within each client cluster, data is organized by content server. For each (cluster, content server) pair, a mean network distance is computed between the CIDR prefix address representing that client cluster and the respective content server. For example, referring to the first row of Table IV, client cluster has a CIDR prefix of 135.104.23.xx, the mean network distance between clients in that cluster and content server 1 is determined to be 10. The network distance was previously described as being computed as the round trip time (RTT). This value is further modified prior to being provided as input to the mapping operation. Specifically, a testing index value is computed from the network distance and provided to the mapping operation. The testing index is computed in one embodiment as:

$$\text{Testing index} = (\text{Network distance}) * \left(1 - \frac{1}{\sqrt{\text{\# distance tuples}}}\right)$$

In the case where the number of hits (i.e., received distance tuples) at a content server is very large, the square root term becomes insignificant, resulting in a testing index value identical to the network distance value. However, in the case where the number of hits at the content server is small, the square root term becomes significant, thereby reducing the testing index to a value less than the network distance value.

The primary objective of computing a testing index value as a modification to the network distance value is that for a content server receiving less than the average number of distance tuples over time as compared with other content servers in the network, the likelihood of that content server being selected as a best-performing content server is diminished. This inequity arises strictly as a consequence of the content server receiving an insufficient amount of monitoring data (i.e., distance tuples from clients) to make a proper determination as to the server's candidacy as a best-performing content server. To address this inequity, the testing index value is computed which raises the selection probability of a content server receiving fewer distance tuples over time than average. It is further noted that the testing index equation recited above represents one exemplary approach for addressing the aforementioned inequity. Other computations for addressing the inequity are within the scope of the present disclosure.

B. Mapping Operation

As stated above, the clustering/mapping software operates in two stages. The first stage, clustering was previously described. As stated above, the output of the clustering operation (See Table IV) is provided as input to the mapping operation.

After determining the client clusters, a mapping operation is performed. The mapping operation pairs each identified client cluster with one or more {preferred content server, domain index pairs} in the network where each content server is assigned a selection probability as illustrated in Table IV.

TABLE IV

| client cluster I | Preferred Content Server, domain index pair | Computed Testing Index | Assignment Probability |
|---|---|---|---|
| 1 | 1, 12 | 10 | .90 |
| 1 | 2, 31 | 15 | .05 |
| 1 | 3, 222 | 20 | .05 |
| 2 | 1, 14 | 8 | .92 |
| 2 | 4, 42 | 14 | .04 |
| 2 | 6, 36 | 21 | .04 |

Table IV is an exemplary table for illustrating the output of the mapping operation. The first column of Table IV identifies the particular client cluster. Two client clusters, clusters 1 and 2 are shown in the table for simplicity. Each client cluster contains a row for each preferred content server, domain index pair identified by the mapping operation as having a low round trip time. For example, row 1 of Table IV identifies content server, domain index pair: (1,12). That is, for client cluster 1, content servers 1 is identified as having a low round trip time with respect to the client cluster and further stores domain index 12. Also shown at column 4 of Table IV is a selection probability which is assigned to each preferred content server in the table to ensure that the respective maximum service capacities of each content server is never exceeded. This is to prevent a situation where a content server is continuously selected as a consequence of having the minimum testing index value. For example, referring to the first three rows of Table V, it is shown that client cluster 1 has associated therewith three preferred content servers 1, 2 and 3. Content server 1 has the smallest computed testing index, i.e., 10. Each client request associated with client cluster 1 would select content server 1 in each case as the content server having the smallest testing index. This is undesirable as it may lead to congestion at content server 1, and may further exceed its service capacity. To circumvent this occurrence, selection probabilities are assigned to each content server to distribute the request load in a manner which ensures that the respective network capacities of each content server will not be exceeded. As shown in the table, while the testing indices associated with content servers 2 and 3 are higher than the testing index of content server 1, they are selected 0.05 percent of the time, respectively based on their respective selection probabilities. The manner in which the selection probabilities are determined will now be described.

The selection probabilities are assigned by performing a min-cost network flow optimization routine which attempts to route network traffic in a more globally optimal manner to prevent or minimize network congestion at each content server in the network. The min-cost network flow optimization routine first computes a flow map which characterizes the data flow in the network. The flow map considers system constraints including bounds on the content servers to not receive more traffic than they can handle. It is further noted that such server capacity constraints can be manually altered to achieve desired effects in traffic flow. Other system constraints which may be incorporated include setting threshold capacities such that traffic originating from a domain/cluster (e.g., domain X/cluster Y), will never be sent to a content server whose round trip time is much worse than (X,Y)'s preferred content server. For example, a threshold for much worse can be quantitatively determined to be no more than 2 times the round trip time (RTT).

Other system constraints include forcing traffic for a domain/cluster to be split among at least three or more content servers.

Other contemplated system constraints include artificially adjusting the maximum service capacities of the content servers to lower values to ensure that each content server will always have a residual capacity to respond to high-traffic bursts.

FIG. 4 is a flow map which characterizes the data flow in the system. FIG. 4 also determines the probabilities shown in the mapping table, as illustrated by column 4 of Table V. The flow map of FIG. 4 includes a first column of nodes $32a$–$f$ and a second column of nodes $34a$–$g$. Nodes $32a$–$f$ represent (client cluster, domain index) pairs. These nodes can be considered demand nodes in that each pair defines a requestor (i.e., client cluster) and the requested content (i.e., domain index). Nodes $34a$–$g$ represent all content servers in the network and can be considered resources for satisfying the requesting nodes $32a$–$f$. The directed arrows represent the flow from demand nodes $32a$–$f$ to resource nodes $34a$–$g$. Each directed arrow defines a distance from a demand node (client cluster) to a resource node (cache). These distances may be obtained directly from the output of the clustering algorithm. For example, directed arrow 36 is assigned a distance of 20 from the clustering algorithm.

It is an objective of the assignment operation to push flow from the demand nodes to the resource nodes in such a way that the majority of flow is conducted along directed arrows whose distance values are small thereby promoting minimum round trip time. However, as an additional consideration, it must be ensured that the resource nodes on the right $34a$–$g$ are not overloaded.

Promoting minimum round trip time while preventing overloading at the content servers is achieved in accordance with the assignment operation by assigning a capacity value to each resource node $34a$–$g$ on the right defining each node's service capacity. Second, each node on the left $32a$–$g$ is assigned a demand value which defines the amount of demand from each client cluster for each domain. This value is determined from the aggregation of the number of hits emanating from that client cluster for each domain over time. The hit total provides a measure for estimating future demand. The demand, capacity and directed arrow distance measurements comprise the inputs required by the flow map to assign content servers which reduce round trip time while preventing congestion.

More particularly, the problem to be solved may be characterized as one of assigning content servers in the network such that the total number of hits assigned to any of the content servers on the right is less than their capacity, while ensuring that most of the assignments minimize the network distance. We solve the problem using a conventional minimum-cost flow algorithm. For a more detailed description of a minimum cost flow algorithm, see A. V.

Goldberg, "An efficient implementation of a scaling minimum-cost flow algorithm", Journal of Algorithms, volume 22, pages 1–29, 1997. The solution of the minimum-cost flow algorithm is a set of probabilities for choosing content servers from the mapping as illustrated in Table IV above.

Time-To-Live Calculation

The embodiments described above all share as a primary objective the goal of returning to a client the IP address of a content server considered closest as defined by the invention. Generally, client DN requests generally involve accessing websites having multiple pages where each page access requires a new DNS request for a new connection. Given the fact that the answer returned from the redirection server will in all likelihood be the same for each request in a given user session, it is apparent that this request process is inefficient. Accordingly, the invention attempts to obviate this inefficiency by returning the first result to the client with a corresponding time-to-live field which informs the client's browser the time for which the initial response remains valid. In other words, an efficiency is realized in that the browser need not make redundant DN requests for the same content for a stipulated time as defined by the Time-to-live calculation:

$$TTL' 10^6 * \frac{(DNS\ server\ load)}{(m \gg s)^2 \sqrt{N}}$$

$m'$ sample mean of network distance to chosen server $s2'$ sample variance of network distance to chosen server The time-to-live calculation effectively outputs larger time-to-live values in the case where the confidence that a content server is a preferred content server is high. Alternatively, the time-to-live calculation outputs a smaller time-to-live result in the case where there is less confidence in a content server being preferred.

It will be understood that various modifications may be made to the embodiments disclosed herein, and that the above descriptions should not be construed as limiting, but merely as exemplifications of preferred embodiments. Those skilled in the art will envision other modifications within the scope and spirit of the claims appended hereto.

What is claimed is:

1. A method for selecting a content server in a network including a plurality of content servers and at least one redirection server, comprising:
    (a) creating client clusters using the steps of:
        (a1) identifying clients having similar network distance proterties;
        (a2) grouping distance tuples using content server ID and classless inter-domain routing address (CIDR) prefix similarity to define grouping data values, a distance tuple comprising at least one of a network distance, a content server identifier, a time-stamp, and a client internet protocol (IP) address;
        (a3) storing the data values at leaf nodes of a hierarchical tree structure having a root node representing CIDR space and a plurallty of interior and leaf nodes, said data values including load information, network distances, and a number of the tuples; and
        (a4) defining the client clusters by combining leaf nodes having sufficient similarity into parent nodes and identifying remaining leaf nodes as the client clusters;
    (b) identifying at least one best-performing content server for each of said client clusters by selecting at least one content server having a minimal network distance to the client cluster; and
    (c) mapping the client clusters with the at least one best-performing content server.

2. The method of claim 1, wherein the at least one redirection server is an authoritative domain name (DN) server coupled to a plurality of local DNS servers.

3. The method of claim 1, wherein the step (c) further comprises:
    assigning selection probability to the at least one best-performing content server to ensure that maximum service capacity of the server is not exceeded.

4. The method of claim 1, wherein the step (a3) further comprises:
    collecting at said content servers load tuples, wherein each load tuple comprises at least one of a time-stamp, a content-server ID, a client IP address, a number of hits, and a domain index.

5. The method of claim 4, further comprising:
    pulling the distance and load tuples at successive data acquisition intervals; and
    storing the distance and load tuples at said at least one redirection server.

6. The method of claim 5, further comprising the step of multiplying data values corresponding to the distance and load tuples by a weighting factor in each of said successive data acquisition intervals.

7. The method of claim 1, wherein a network distance is computed as one of a round trip time, jitter, bandwidth and packet loss.

8. The method of claim 7, wherein said round trip time is computed by monitoring data packets transmitted and received by the content servers.

9. The method of claim 1, wherein the step (c) further comprises:
    assigning an assignment probability to the at least one best-performing content server.

10. The method of claim 9, wherein said assignment probabilities are obtained from a flow map characterizing data flow in the network.

11. A system for selecting a content server in a network including a plurality of content servers and at least one redirection server, comprising:
    a first means creating client clusters using the steps of:
        (a1) identifying clients having similar network distance properties;
        (a2) grouping distance tuples using content server ID and classless inter-domain routing address (CIDR) prefix similarity to define arouning data values, a distance tuple comprising at least one of a network distance, a content server identifier, a time-stamp, and a client internet protocol (IP) address;
        (a3) storing the data values at leaf nodes of a hierarchical tree structure having a root node representing CIDR space and a plurality of interior and leaf nodes, said data values including load information, network distances, and a number of the tuples; and
        (a4) defining the client clusters by combining leaf nodes having sufficient similarity into parent nodes and identifying remaining leaf nodes as the client clusters;
    a second means identifying at least one best-performing content server for each of said client clusters by selecting at least one content server having a minimum network distance to the client cluster; and a third means mapping the client clusters with the at least one best-performing content server.

12. The system of claim 11, further including a forth means for assigning selection probability to the at least one best-performing content server to ensure that maximum service capacity of the server is not exceeded.

13. The system of claim 11, wherein the first means further includes:
a fourth means collecting at said content servers load tuples, wherein each load tuple comprises at least one of a time-stamp, a content-server ID, a client IP address, a number of hits, and a domain index.

14. The system of claim 11, wherein the first means further includes:
a fifth means modifying the network distance based upon a number of distance tuples received.

15. The system of claim 11, wherein the first means further includes:
a sixth means maintaining identification of said at least one best-performing content server for an amount of time determined by calculating a confidence level.

* * * * *